US012352416B1

(12) United States Patent
Liu

(10) Patent No.: US 12,352,416 B1
(45) Date of Patent: Jul. 8, 2025

(54) LIGHTING DEVICE

(71) Applicant: Haiyang Liu, Binzhou (CN)

(72) Inventor: Haiyang Liu, Binzhou (CN)

( * ) Notice: Subject to any disclaimer, the term of this patent is extended or adjusted under 35 U.S.C. 154(b) by 0 days.

(21) Appl. No.: 19/001,034

(22) Filed: Dec. 24, 2024

(30) Foreign Application Priority Data

Dec. 19, 2024 (CN) ......................... 202423149792.7

(51) Int. Cl.

| | |
|---|---|
| ***F21V 21/096*** | (2006.01) |
| ***F21S 9/02*** | (2006.01) |
| ***F21V 23/00*** | (2015.01) |
| ***F21V 23/06*** | (2006.01) |

(52) U.S. Cl.
CPC .............. *F21V 21/096* (2013.01); *F21S 9/02* (2013.01); *F21V 23/003* (2013.01); *F21V 23/06* (2013.01)

(58) Field of Classification Search
CPC ...... F21V 21/096; F21V 23/003; F21V 23/06; F21S 9/02
See application file for complete search history.

(56) References Cited

U.S. PATENT DOCUMENTS

| | | | | |
|---|---|---|---|---|
| D830,585 | S * | 10/2018 | Grandadam | D26/2 |
| 10,271,019 | B1 * | 4/2019 | Berg | H04N 23/57 |
| 2008/0094857 | A1 * | 4/2008 | Smith | F21K 9/232 362/649 |
| 2014/0049963 | A1 * | 2/2014 | McGuire | F21K 9/232 362/382 |
| 2017/0241596 | A1 * | 8/2017 | Chien | F21V 23/0442 |
| 2020/0340628 | A1 * | 10/2020 | Cao | F21V 23/045 |
| 2023/0043693 | A1 * | 2/2023 | Benjestorf | F21K 9/23 |

* cited by examiner

*Primary Examiner* — Bryon T Gyllstrom
(74) *Attorney, Agent, or Firm* — Birchwood IP

(57) ABSTRACT

A lighting device is provided. Which includes a lighting component, a lamp holder component; the lighting component is connected to the lamp holder component; the lighting component includes a translucent body, a lighting base, a first electrical connector, a battery, a light-emitting component, and a first magnetic attraction member; the transparent body is connected to the lighting base, the first electrical connector is detachably connected to the lighting base. The battery, the light-emitting component, and the first magnetic attraction member are located in the lighting base; the first electrical connector is provided with a screw mouth configured for transmitting power. Through the lighting component and the lamp holder component, the assembly of the lighting device is flexible and versatile, and the use range is increased.

9 Claims, 27 Drawing Sheets

26

LIGHTING DEVICE

CROSS-REFERENCE TO RELATED DISCLOSURES

This application claims priority to Chinese Patent Disclosure No. 202423149792.7, filed on Dec. 19, 2024, which is hereby incorporated by reference in its entirety.

TECHNICAL FIELD

The present disclosure relates to the field of light-emitting device technologies, and in particular, to a lighting device.

BACKGROUND

Ordinary incandescent bulbs emit heat and light by current through a filament made of tungsten to illuminate or warm the surroundings. An interior of the lamp is filled with a single or mixed gas of helium, argon, and nitrogen to enhance the durability of the tungsten filament, thereby maintaining the lamp's lifespan for a long time. The incandescent bulb has an integral bulb made of glass or plastic material, and a gas injection port for filling the interior with mixed gas, the gas injection port is extended from an outer.

In addition, in recent years, LED lights using LED modules have been manufactured that can save energy and display various indoor and outdoor lighting decorations.

An assembly between the existing lamp head and lamp holder has problems of insufficient flexibility and convenience in use, and significant limitations.

SUMMARY

The present disclosure aims to solve at least one of the above technical problems by providing a lighting device that can improve the flexibility of lighting use and expand a use scope of the lighting device.

In a first aspect, the present disclosure provides a lighting device, including:

- a lighting component and a lamp holder component; where the lighting component is connected to the lamp holder component;
- the lighting component includes a translucent body, a lighting base, a first electrical connector, a battery, a light-emitting component, and a first magnetic attraction member;
- the transparent body is connected to the lighting base, the first electrical connector is detachably connected to the lighting base; the battery, the light-emitting component, and first magnetic attraction member are located in the lighting base; the first electrical connector is provided with a screw mouth configured for transmitting power.

In some embodiments of the present disclosure, the lamp holder component is provided with a lamp holder body, a protruding part, and a second electrical connector; the lamp holder body is connected to the protruding part, the second electrical connector is located in the protruding part, and the second electrical connector is connected to an external power source.

In some embodiments of the present disclosure, the first electrical connector is extended into the protruding part, and the screw mouth contacts the second electrical connector.

In some embodiments of the present disclosure, the lamp holder component is provided with a lamp holder body and a second magnetic attraction member.

In some embodiments of the present disclosure, the lamp holder component is further provided with a magnetic suction bracket; the lamp holder body is connected to the magnetic suction bracket, and the magnetic suction bracket is connected to the second magnetic attraction member.

In some embodiments of the present disclosure, the lamp holder component includes a lamp holder body and a lamp holder connector; the lamp holder body is connected to the lamp holder connector.

In some embodiments of the present disclosure, the lamp holder connector is provided with an assembly hole, a threaded interface, a first retaining ring, a second retaining ring, and a fitting groove.

In some embodiments of the present disclosure, the lighting device further includes a first support rod, a support seat, a lampshade, and a lampshade connector.

In some embodiments of the present disclosure, the lighting device further includes a second support rod.

In some embodiments of the present disclosure, the lighting device further includes a hinge.

In some embodiments of the present disclosure, the lighting device further includes a control circuit board, and the control circuit board has a control circuit;

- where the control circuit includes a charging interface, a charging circuit, a power supply switching circuit, a controller, a light driving circuit, a first voltage conversion circuit, and a second voltage conversion circuit;
- the charging interface is respectively connected to the charging circuit and the power supply switching circuit; the charging circuit is connected to the battery; the first voltage conversion circuit is respectively connected to the power supply switching circuit and the light driving circuit; the second voltage conversion circuit is respectively connected to the power supply switching circuit and the controller, and the controller is connected to the light driving circuit.

The present disclosure provides a lighting device, through the lighting component and the lamp holder component, a flexible and versatile assembly of the lighting device can be achieved, and the use range is increased.

Figure 1:
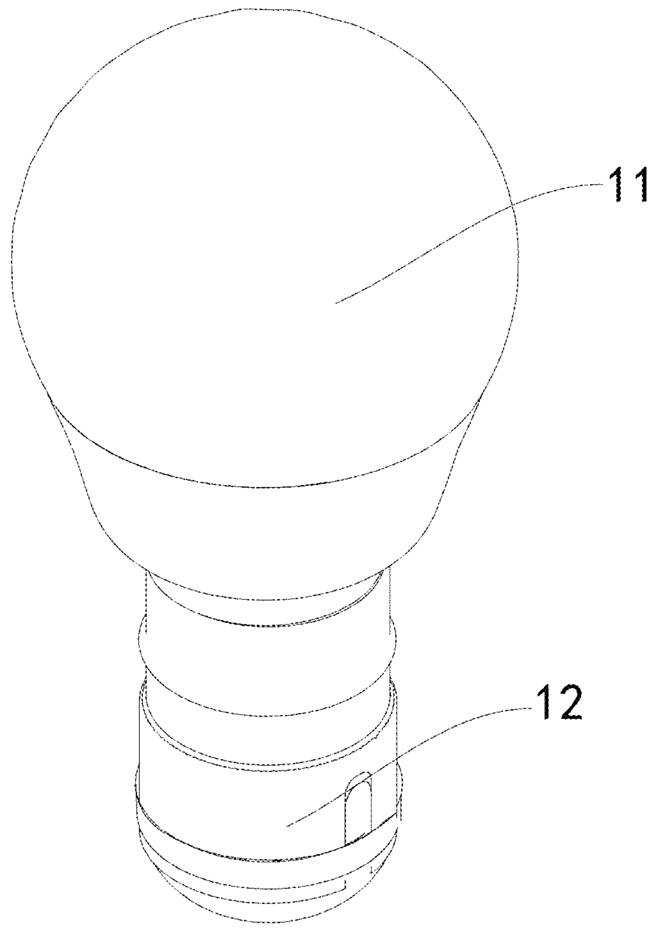
FIG. 1 is a schematic structural diagram of a lighting device provided in a first embodiment of the present disclosure.

Numeral reference: 11-lighting component; 111-translucent body; 112-lighting base; 113-first electrical connector; 1131-screw mouth; 12-lamp holder component; 121-lamp holder body; 1211-first fixing hole; 1212-second fixing hole; 1213-third fixing hole; 1214-fitting part; 122-protruding part; 123-second electrical connector; 124-second magnetic attraction member; 125-magnetic suction bracket; 126-lamp holder connector; 1261-assembly hole; 1262-threaded interface; 1263-first retaining ring; 1264-second retaining ring; 1265-fitting groove; 13-first support rod; 14-support seat; 15-lampshade; 16-lampshade connector; 17-hinge; 18-second support rod.

DESCRIPTION OF EMBODIMENTS

The following will provide a clear and complete description of the technical solution in the embodiments of the present disclosure, combined with the accompanying drawings. Obviously, the described embodiments are only a part of the embodiments of the present disclosure, not all of them. Based on the embodiments in the present disclosure, all other embodiments obtained by those skilled in the art without creative work are within the protection scope of the present disclosure.

In a description of the present disclosure, it should be understood that terms "center", "longitudinal", "transverse", "length", "width", "thickness", "up", "down", "front", "back", "left", "right", "vertical", "horizontal", "top", "bottom", "inside", "outside" and other directional or positional relationships indicated are based on the directional or positional relationships shown in the accompanying drawings, only for a convenience of describing the present disclosure and simplifying the description, and do not indicate or imply that the device or component referred to must have a specific orientation, be constructed and operated in a specific orientation, and therefore cannot be understood as a limitation of the present disclosure. In addition, terms "first" and "second" are only used for descriptive purposes and cannot be understood as indicating or implying relative importance or implying the number of technical features indicated. Thus, the features limited to "first" and "second" may explicitly or implicitly include one or more features. In the description of the present disclosure, the meaning of "a plurality of" refers to two or more, unless otherwise specifically limited.

In the present disclosure, term "exemplary" is used to indicate used as an example, illustration, or demonstration. Any embodiments described as "exemplary" in the present disclosure may not necessarily be interpreted as more preferred or advantageous than other embodiments. In order to enable those skilled in the art to implement and use the present disclosure, the following description is provided. In the following description, details are listed for the purpose of explanation. It should be understood that those skilled in the art can understand that the present disclosure can be implemented without using these specific details. In other embodiments, well-known structures and processes will not be elaborated in detail to avoid unnecessary details that render the description of the present disclosure obscure. Therefore, the present disclosure is not intended to be limited to the embodiments shown, but is consistent with a widest scope of principles and features disclosed in the present disclosure.

Figure 2:
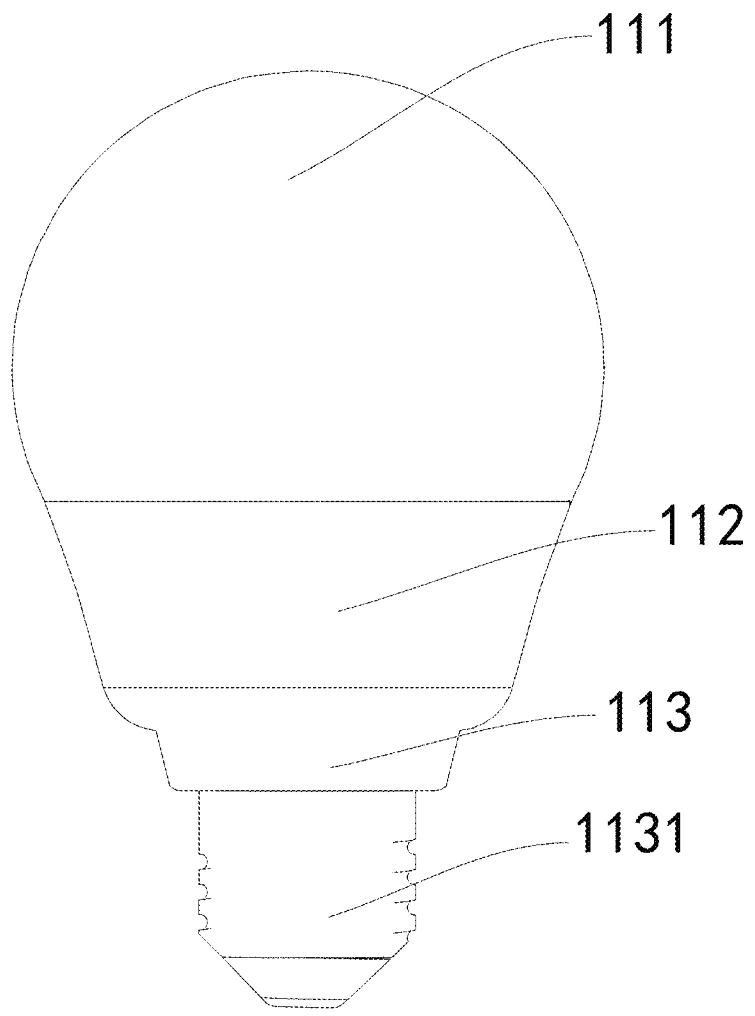
FIG. 2 is a schematic structural diagram of a lighting component of the lamp device shown in FIG. 1.
Figure 3:
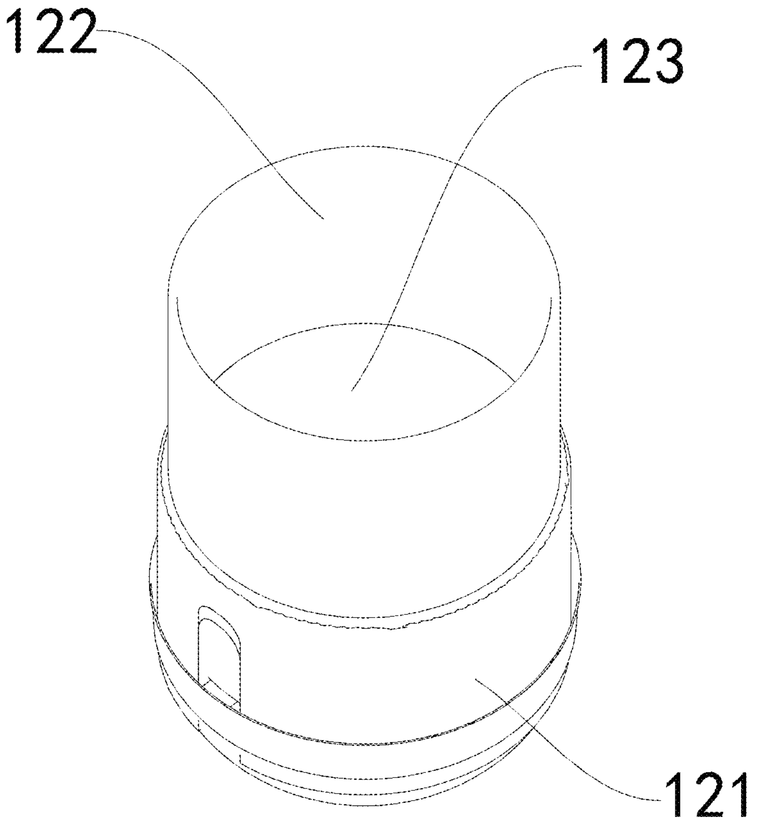
FIG. 3 is a schematic structural diagram of a lamp holder component in the lighting device shown in FIG. 1.

Based on FIGS. 1 to 3, it can be understood that the lighting fixture device may include a lighting component 11 and a lamp holder component 12. The lighting component 11 is connected to the lamp holder component 12.

The lighting component 11 may include a translucent body 111, a lighting base 112, a first electrical connector 113, a battery, a light-emitting component, and a first magnetic attraction component.

The translucent body 111 is connected to the lighting base 112, and the first electrical connector 113 is detachably connected to the lighting base 112. The battery, the light emitting component, and the first magnetic attraction component are located in the lighting base 112. The first electrical connector 113 may be provided with a screw mouth 1131 configured to transmit power.

The lamp holder component 12 may be provided with a lamp holder body 121, a protruding part 122, and a second electrical connector 123. The lamp holder 121 is connected to the protruding part 122, and the second electrical connector 123 is provided in the protruding part 122. The second electrical connector 123 is connected to an external power source.

The first electrical connector 113 is extended into the protruding part 122, and the screw mouth 1131 contacts the second electrical connector 123. The external power supply sequentially enters the lighting component 11 after passing through the second electrical connector 123 and the screw mouth 1131, and the light component emits light.

Figure 4:
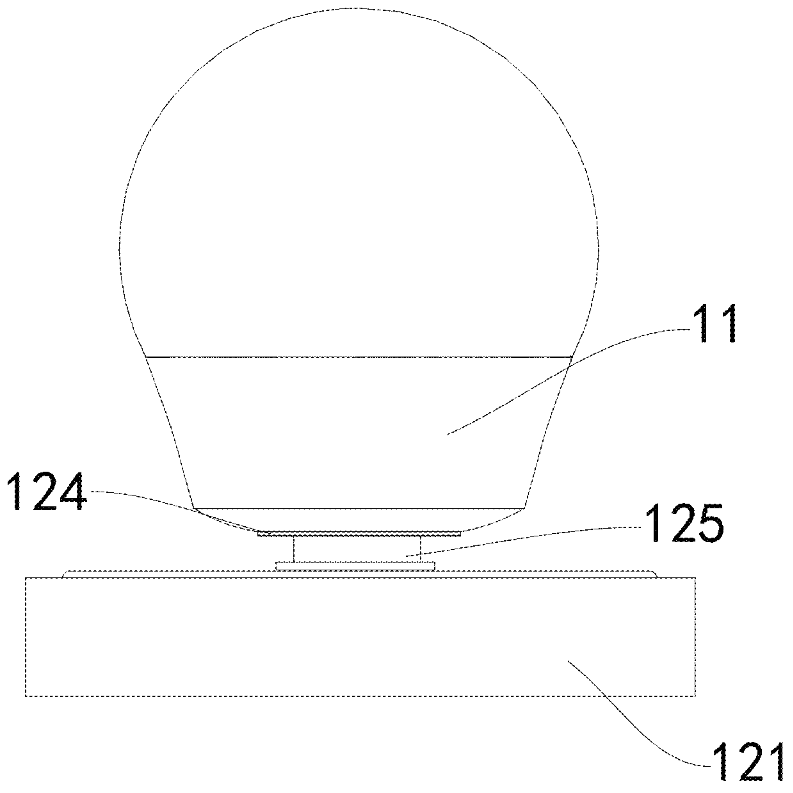
FIG. 4 is a schematic structural diagram of the lighting device provided in a second embodiment of the present disclosure.

Based on FIG. 4, it can be understood that the lamp holder component 12 can be provided with a lamp holder body 121, a second magnetic attraction member 124, and a magnetic suction bracket 125. The lamp holder body 121 is connected to the magnetic suction bracket 125, and the magnetic suction bracket 125 is connected to the second magnetic attraction member 124.

The lighting component 11 is connected to the lamp holder component 12 through a cooperation of the first magnetic attraction component and the second magnetic attraction member 124. The lighting component emits light through the battery.

Figure 5:
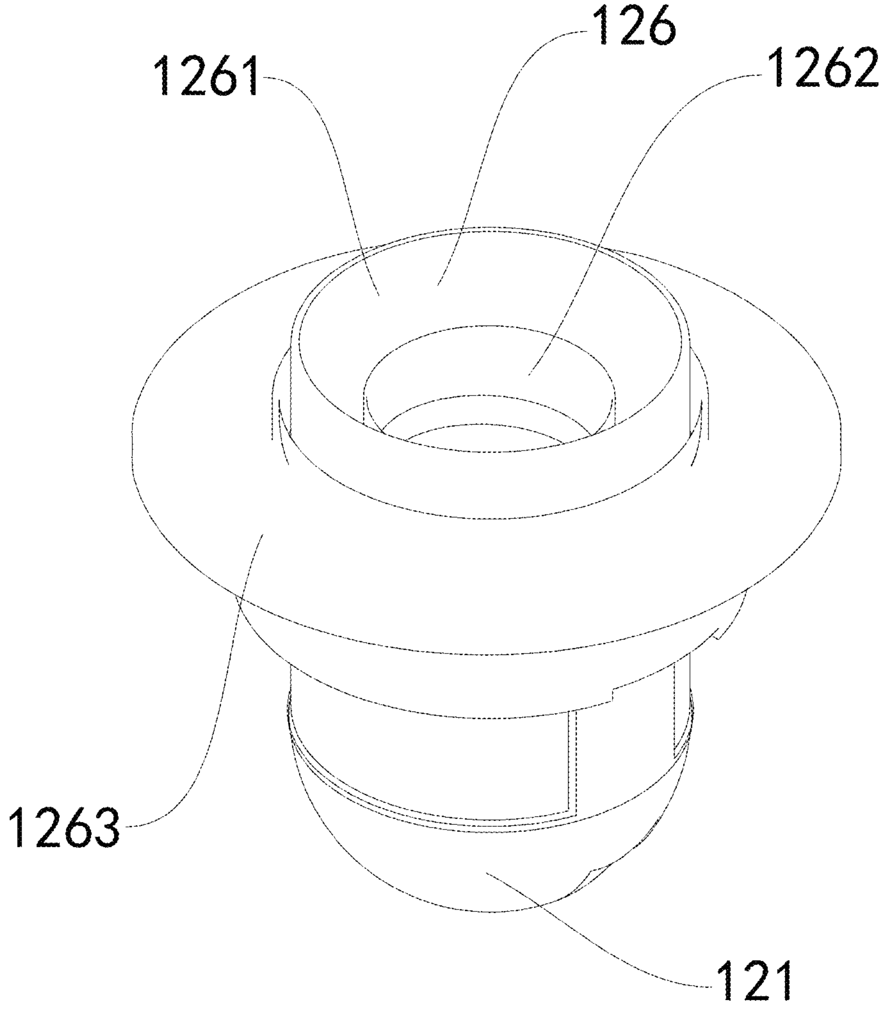
FIG. 5 is a schematic structural diagram of the lighting device provided in a third embodiment of the present disclosure.
Figure 6:
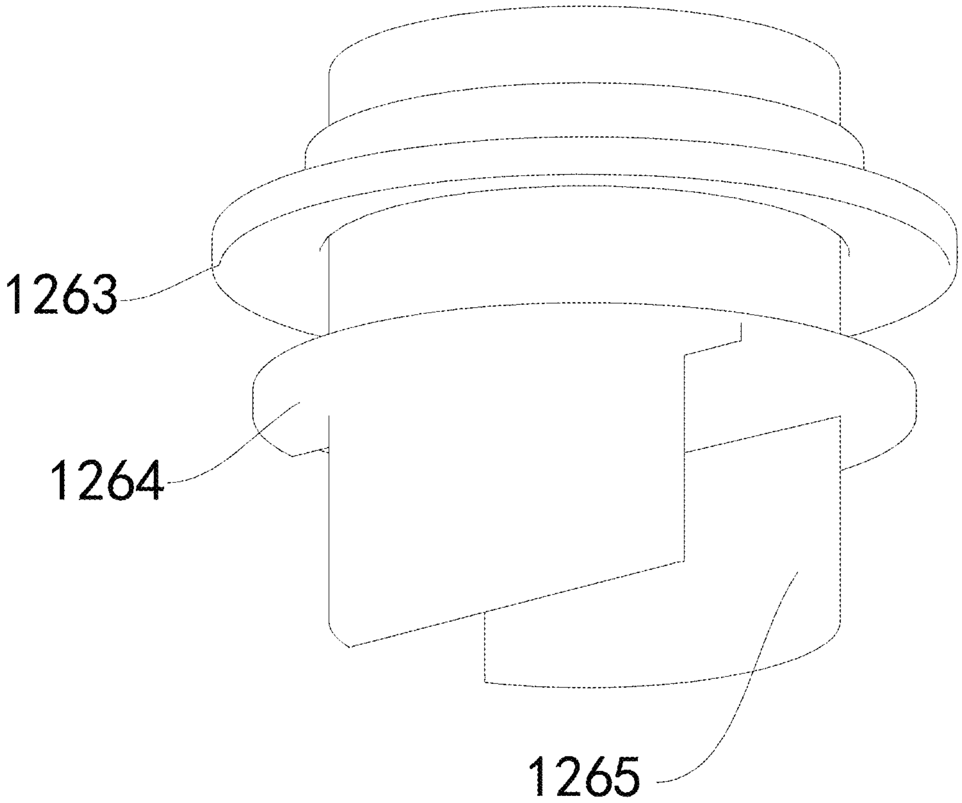
FIG. 6 is a schematic structural diagram of a lamp holder connector of the lighting device shown in FIG. 5.
Figure 7:
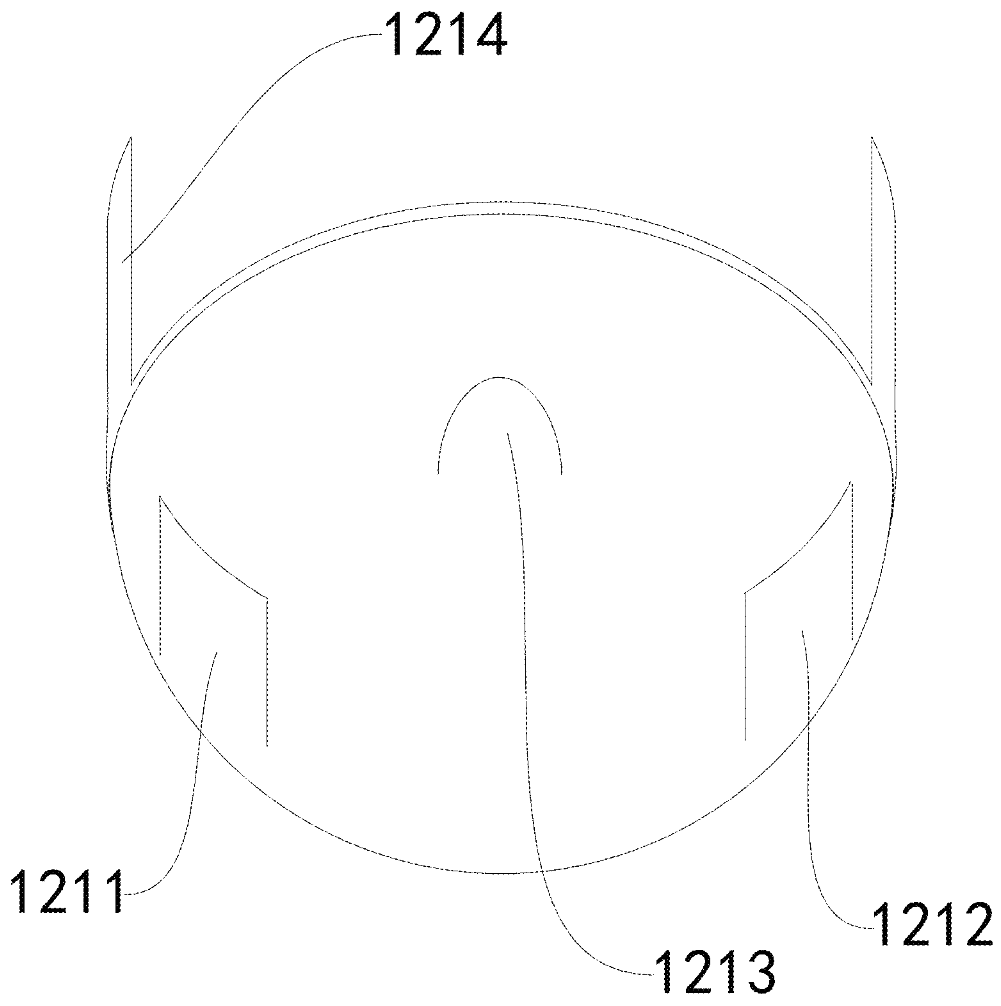
FIG. 7 is a schematic structural diagram of a lamp holder body of the lighting device shown in FIG. 5.

Based on FIGS. 5-7, it can be understood that the lamp holder component 12 may include the lamp holder body 121 and a lamp holder connector 126. The lamp holder body 121 is connected to the lamp holder connector 126.

The lamp holder connector 126 may be provided with an assembly hole 1261, a threaded interface 1262, a first retaining ring 1263, a second retaining ring 1264, and a fitting groove 1265. The threaded interface 1262 is located in the assembly hole 1261, the first retaining ring 1263 is located above the lamp holder connector 126, the second retaining ring 1264 is located below the first retaining ring 1263, and the fitting groove 1265 is provided at a bottom of the lamp holder connector 126.

The lamp holder body 121 can be provided with a first fixing hole 1211, a second fixing hole 1212, a third fixing hole 1213, and a fitting part 1214. The first fixing hole 1211, the second fixing hole 1212, and the third fixing hole 1213 are provided below the lamp holder body 121, and the fitting part 1214 is provided above the lamp holder body 121.

The fitting part 1214 is clamped into the fitting groove 1265, so that the lamp holder body 121 is connected to the lamp holder connector 126. The first fixing hole 1211, the second fixing hole 1212, and the third fixing hole 1213 are convenient for manual fixation. The first electrical connector 113 enters the assembly hole 1261, and the screw mouth 1131 is connected to the threaded interface 1262. The external power supply enters the lighting component 11 after passing through the threaded interface 1262 and the screw mouth 1131, and the lighting component emits light.

Figure 8:
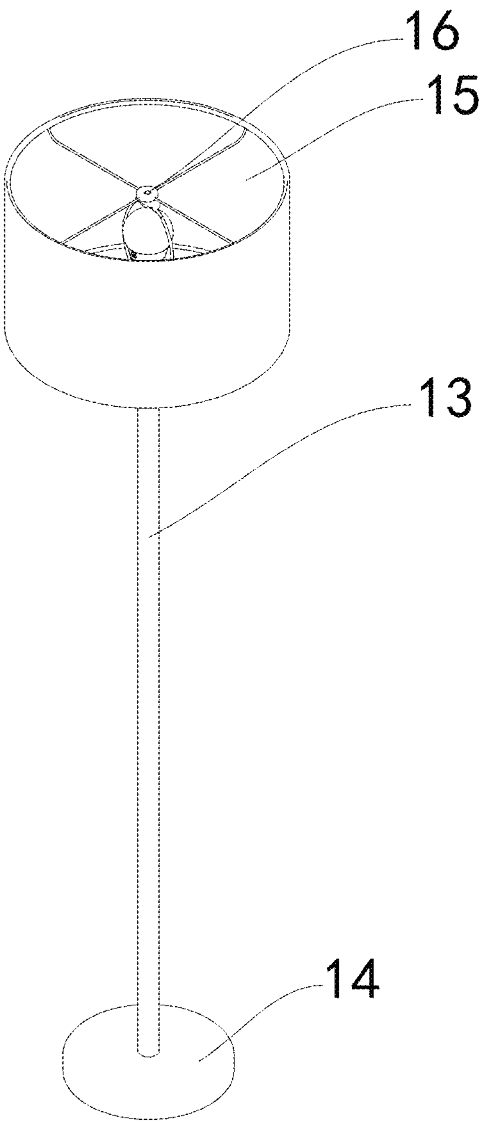
FIG. 8 is a schematic structural diagram of the lighting device provided in a fourth embodiment of the present disclosure.

Based on FIG. 8, it can be understood that the lighting device may include a lighting component 11, a lamp holder component 12, a first support rod 13, a support seat 14, a lampshade 15, and a lampshade connector 16.

The lighting component 11 is connected to the lamp holder component 12, and the lamp holder component 12 is connected to the first support rod 13; the first support rod 13 is connected to the support seat 14. The lampshade 15 is connected to the lamp holder component 12 through the lampshade connector 16.

The lampshade 15 is roughly circular, the first support rod 13 is roughly linear, and the support seat 14 is roughly cylindrical. The lighting component 11 is located on the same vertical line as the first support rod 13.

Figure 9:
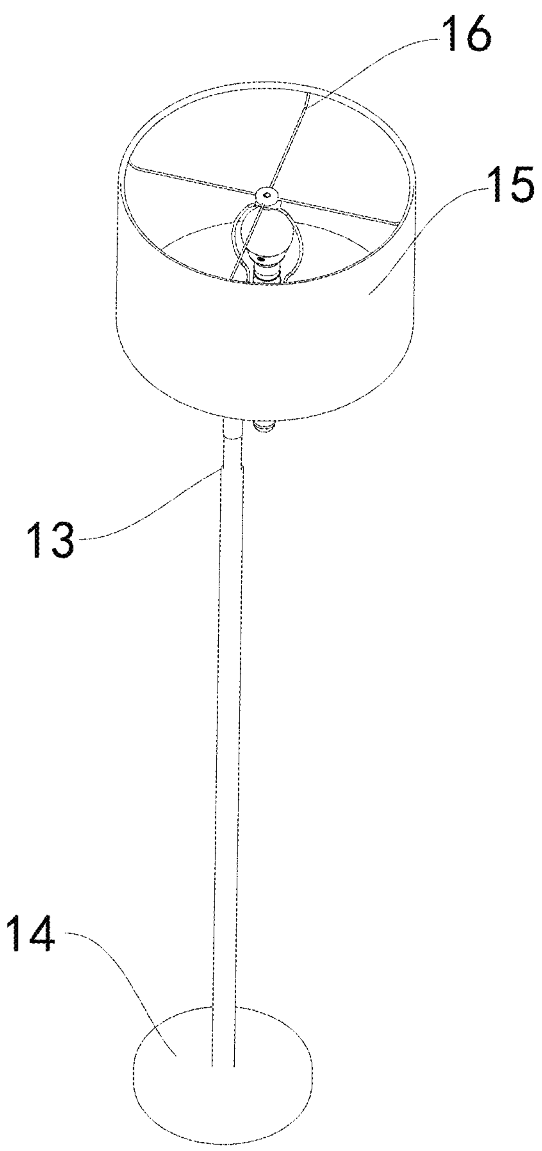
FIG. 9 is a schematic structural diagram of the lighting device provided in a fifth embodiment of the present disclosure.

Based on FIG. 9, it can be understood that the lighting component 11 and the first support rod 13 may not be located on the same vertical line.

Figure 10:
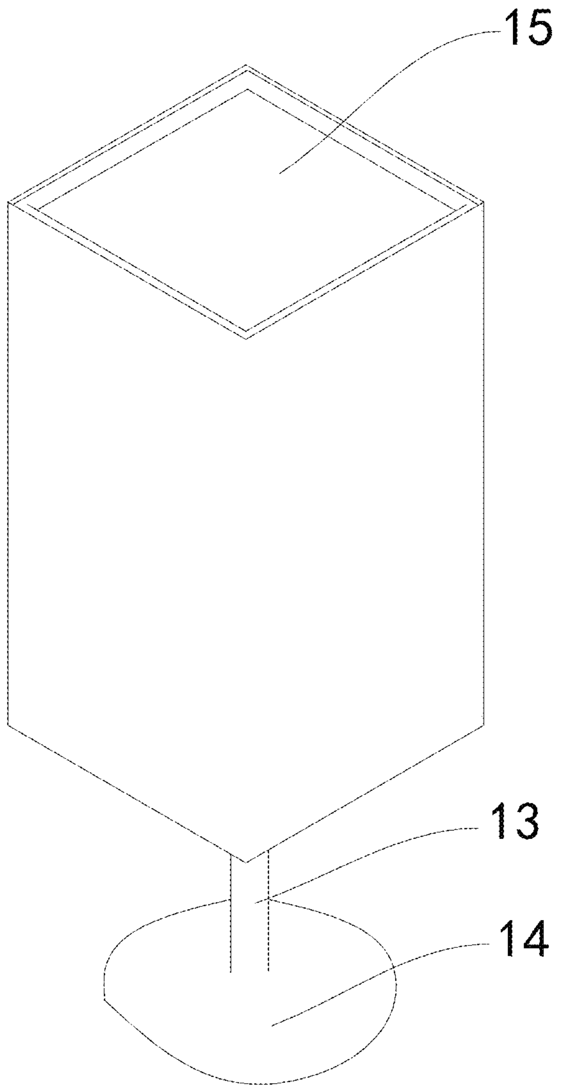
FIG. 10 is a schematic structural diagram of the lighting device provided in a sixth embodiment of the present disclosure.

Based on FIG. 10, it can be understood that the lampshade 15 can be roughly square in shape.

Figure 11:
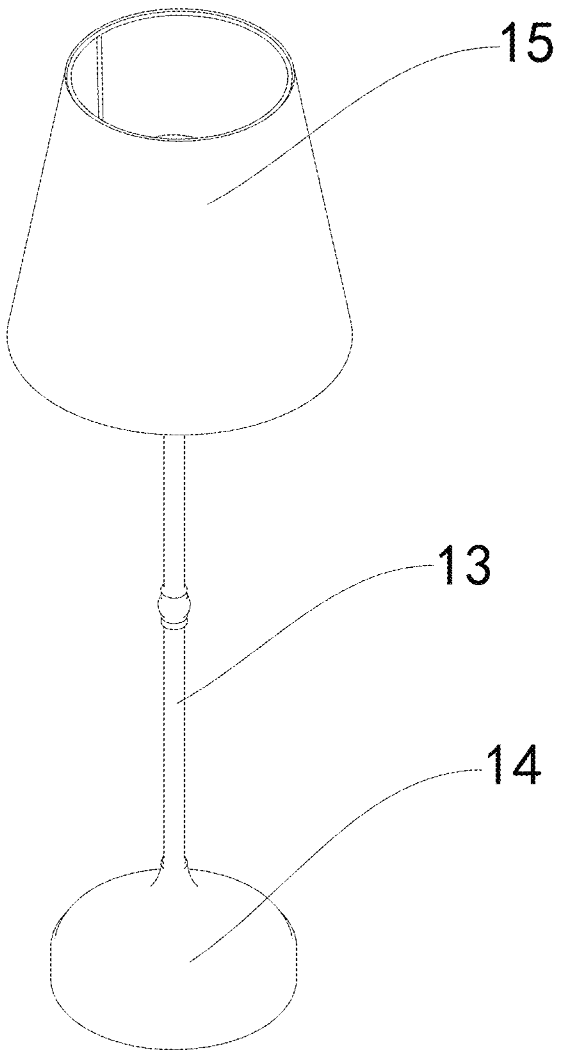
FIG. 11 is a schematic structural diagram of the lighting device provided in a seventh embodiment of the present disclosure.

Based on FIG. 11, it can be understood that the lampshade 15 can be roughly conical in shape. The support seat 14 is roughly spheroidicity.

Figure 12:
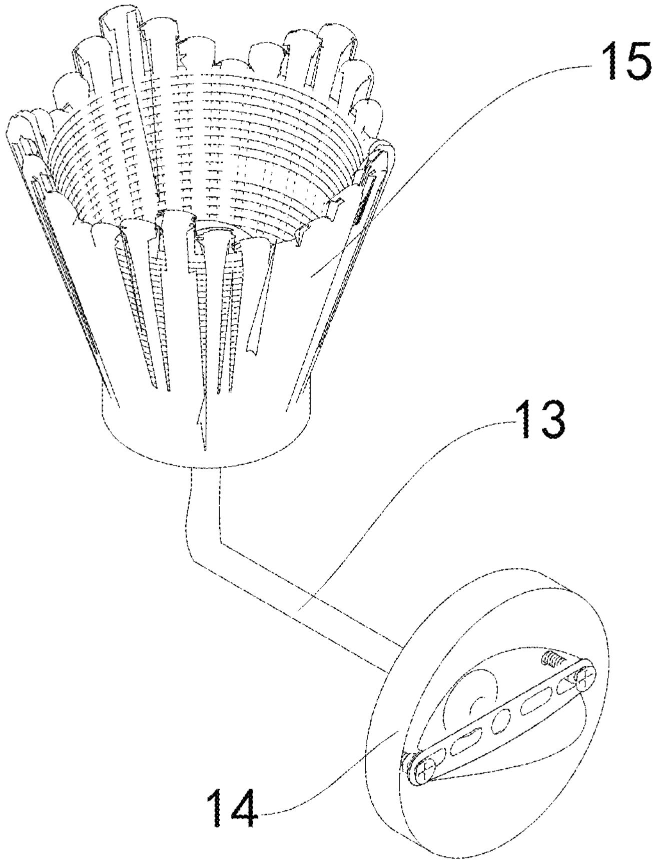
FIG. 12 is a schematic structural diagram of the lighting device provided in an eighth embodiment of the present disclosure.

Based on FIG. 12, it can be understood that lampshade 15 can be made of woven grass or bamboo.

Figure 13:
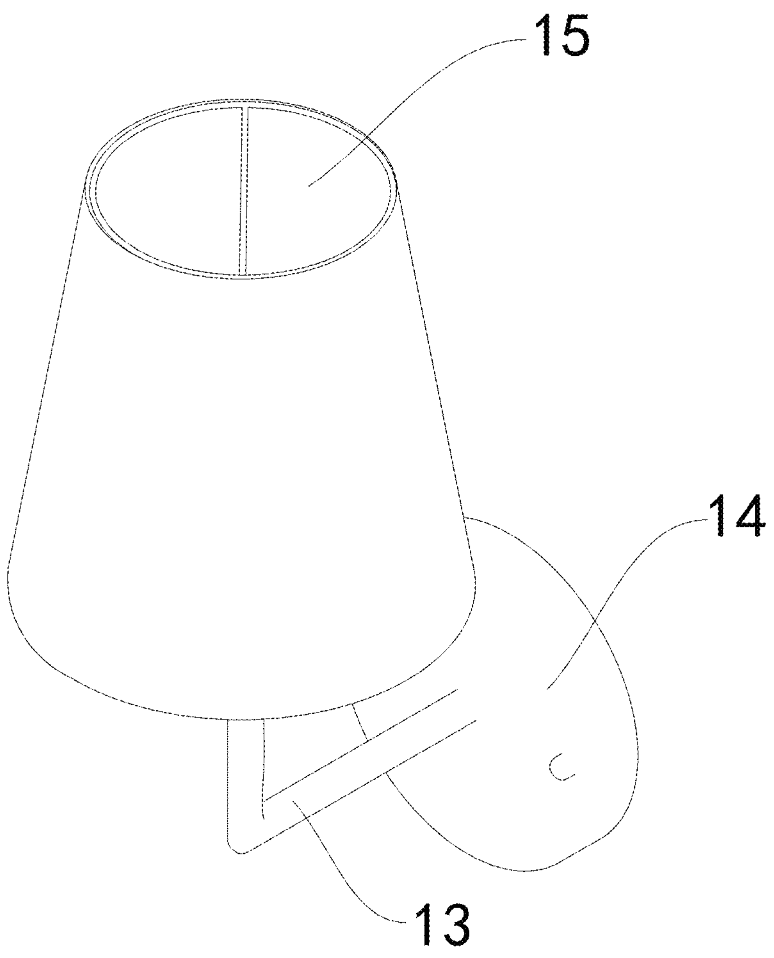
FIG. 13 is a schematic structural diagram of the lighting device provided in a ninth embodiment of the present disclosure.

Based on FIG. 13, it can be understood that the first support rod 13 can be roughly bent.

Figure 14:
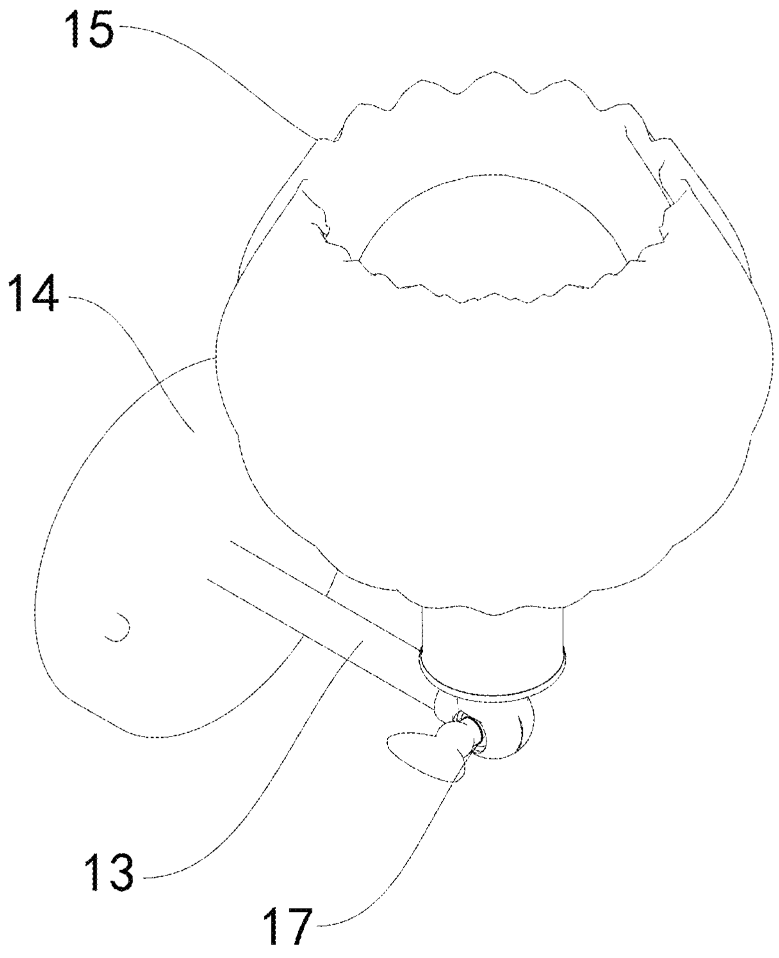
FIG. 14 is a schematic structural diagram of the lighting device provided in a tenth embodiment of the present disclosure.

Based on FIG. 14, it can be understood that the lampshade 15 can be roughly petal shaped.

The lighting device may include the lighting component 11, the lamp holder component 12, the first support rod 13, the support seat 14, the lampshade 15, the lampshade connector 16, and a hinge 17.

The support seat 14 is connected to the first support rod 13, and the first support rod 13 is connected to the hinge 17. The hinge 17 is connected to the lamp holder component 12. The lighting component 11 can be adjusted in angle through the hinge 17.

Figure 15:
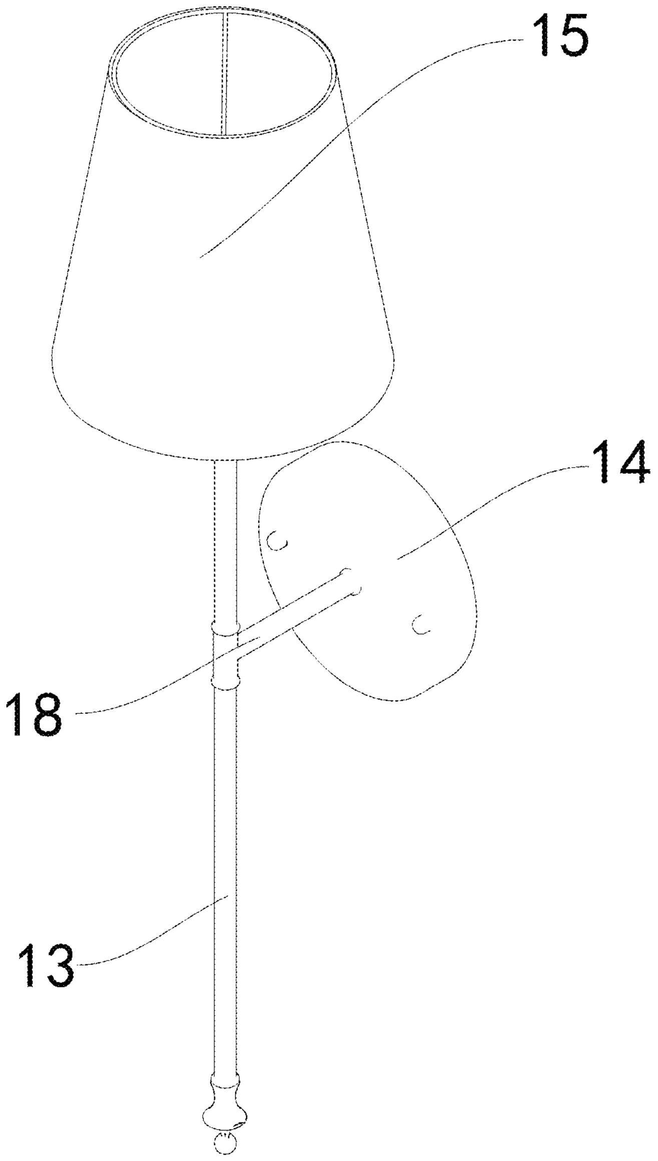
FIG. 15 is a schematic structural diagram of the lighting device provided in an eleventh embodiment of the present disclosure.

Based on FIG. 15, it can be understood that the lighting device may include the lighting component 11, the lamp holder component 12, the first support rod 13, the support seat 14, the lampshade 15, the lampshade connector 16, and a second support rod 18. The support seat 14 is connected to the second support rod 18, and the second support rod 18 is connected to the first support rod 13. The first support rod 13 is connected to the lamp holder component 12.

Figure 16:
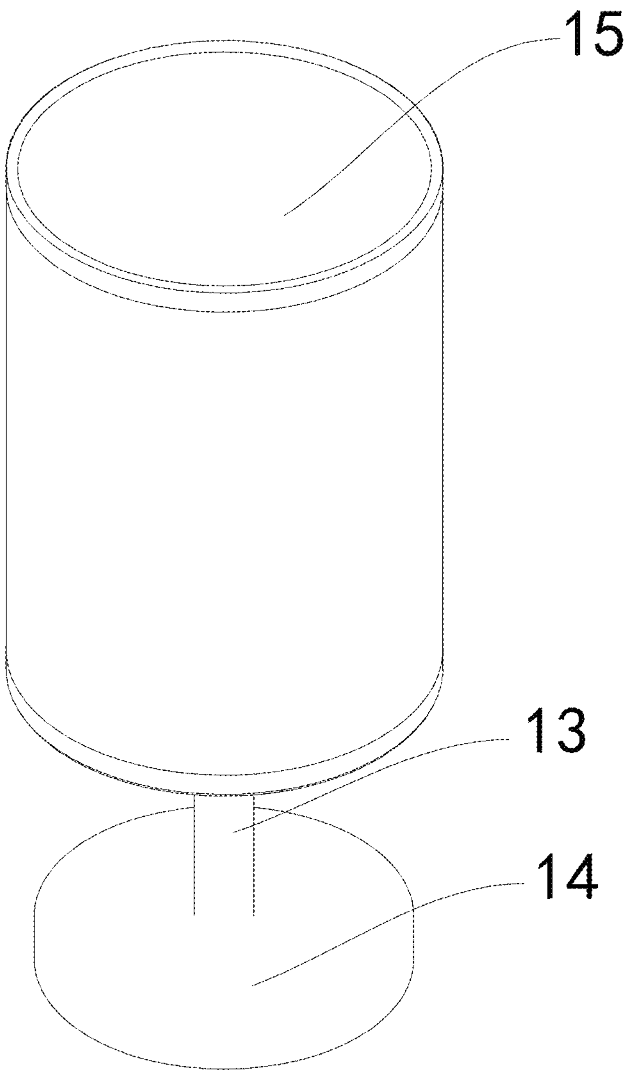
FIG. 16 is a schematic structural diagram of the lighting device provided in a twelfth embodiment of the present disclosure.

Based on FIG. 16, it can be understood that the lampshade 15 can be roughly cylindrical in shape.

Figure 17:
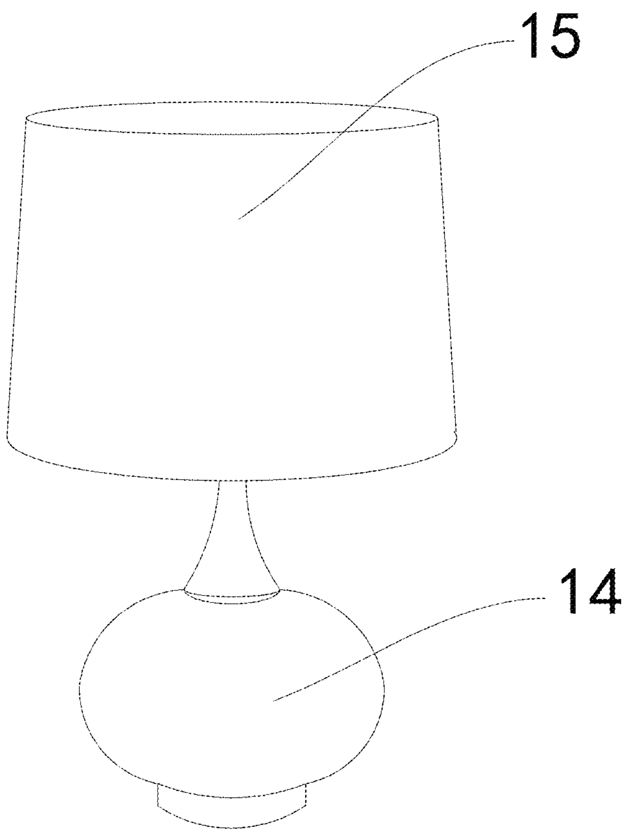
FIG. 17 is a schematic structural diagram of the lighting device provided in thirteenth embodiment of the present disclosure.

Based on FIG. 17, it can be understood that the support seat 14 can be roughly spherical.

In an implementation mode, the lighting device of the present disclosure further includes a control circuit board, and the control circuit board has a control circuit including a charging interface, a charging circuit, a power supply switching circuit, a controller, a light driving circuit, a first voltage conversion circuit, and a second voltage conversion circuit.

Figure 18:
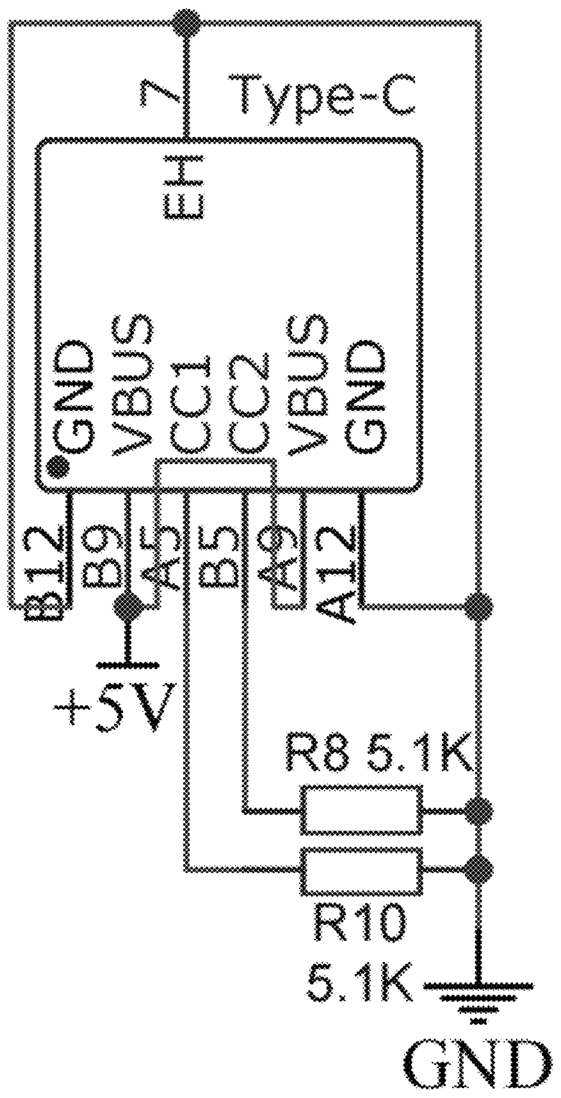
FIG. 18 is a circuit diagram of a charging interface provided in the present disclosure.

In an implementation mode, as shown in FIG. 18, the charging interface can be a Type-C interface, which is configured to connect to the external power source. A in of the charging interface is configured to output a power supply voltage +5V. A CC1 (Control Circuit 1) pin of the charging interface can be grounded through a tenth resistor R10, a CC2 pin thereof can be grounded through an eighth resistor R8, and both a GND (Ground) pin and an EH (Electric Vehicle High Power Charging) pin are grounded.

Figure 19:
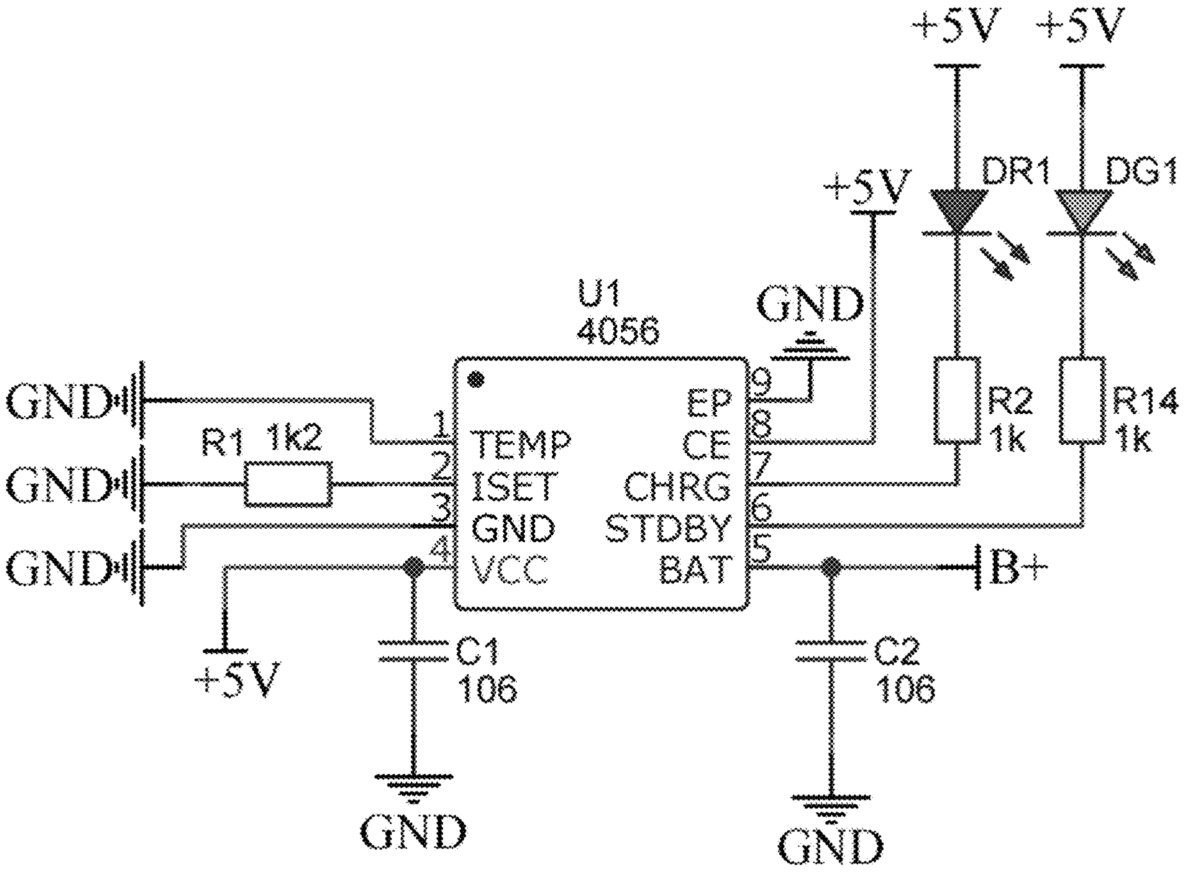
FIG. 19 is a circuit diagram of a charging circuit provided in the present disclosure.

As shown in FIG. 19, the charging circuit includes a first chip U1, a first resistor R1, a second resistor R2, a fourteenth resistor R14, a first capacitor C1, a second capacitor C2, a first indicator light DR1, and a first indicator light DG1. The first chip U1 is a charging management chip, a second pin of the first chip U1 is grounded through the first resistor R1, a fourth pin of the first chip U1 is connected to the power supply voltage +5V and grounded through the first capacitor C1; a CE (Common Emitter) pin of the first chip U1 is connected to the power supply voltage +5V, and both a positive electrode of the first indicator light DR1 and a positive electrode of the first indicator light DG1 are connected to the power supply voltage +5V. A negative electrode of the first indicator light DR1 is connected to a seventh pin of the first chip U1 through the second resistor R2; a negative electrode of the first indicator light DG1 is connected to a sixth pin of the first chip U1 through the fourteenth resistor R14, and a fifth pin of the first chip U1 is connected to a positive electrode B+ of the battery and is grounded through the second capacitor C2. Where, the first chip U1 outputs a charging voltage to the battery through the fifth pin, thereby charging the battery. The first indicator light DR1 is configured to indicate that the battery is being charged, that is, the first indicator light DR1 lights up when the battery is being charged, and the first indicator light DG1 is configured to indicate that the charging is complete.

Figure 20:
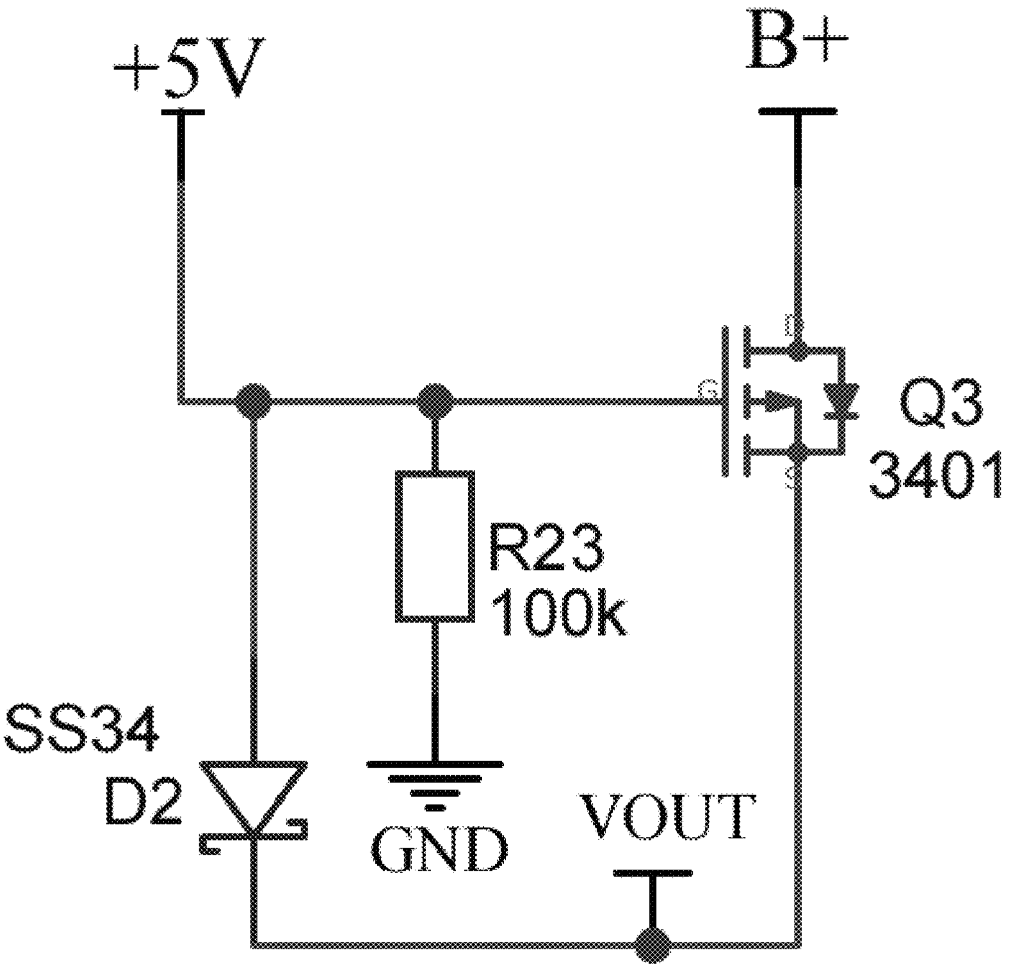
FIG. 20 is a circuit diagram of a power switching circuit provided in the present disclosure.

As shown in FIG. 20, the power supply switching circuit includes a second voltage regulator diode D2, a twenty-third resistor R23, and a third MOS transistor Q3. A positive electrode of the second voltage regulator diode D2, the twenty-third resistor R23 and a grid electrode of the third MOS transistor Q3 are all connected to the voltage supply of +5V, that is, connected to a VBUS (Voltage Bus) pin of the charging interface, and the other end of the twenty-third resistor R23 is grounded. A negative electrode of the second voltage regulator diode D2 is connected to a source electrode of the third MOS transistor Q3, and an output power supply voltage VOUT is connected to a node. A drain electrode of the third MOS transistor Q3 is connected to the positive electrode B+ of the battery. When the charging interface is connected to the external power source, the third MOS transistor Q3 is turned off, and the power supply voltage provided by the external power source is +5V; when the charging interface is not connected to the external power source, the third MOS transistor Q3 is conducted and is powered by the battery.

Figure 21:
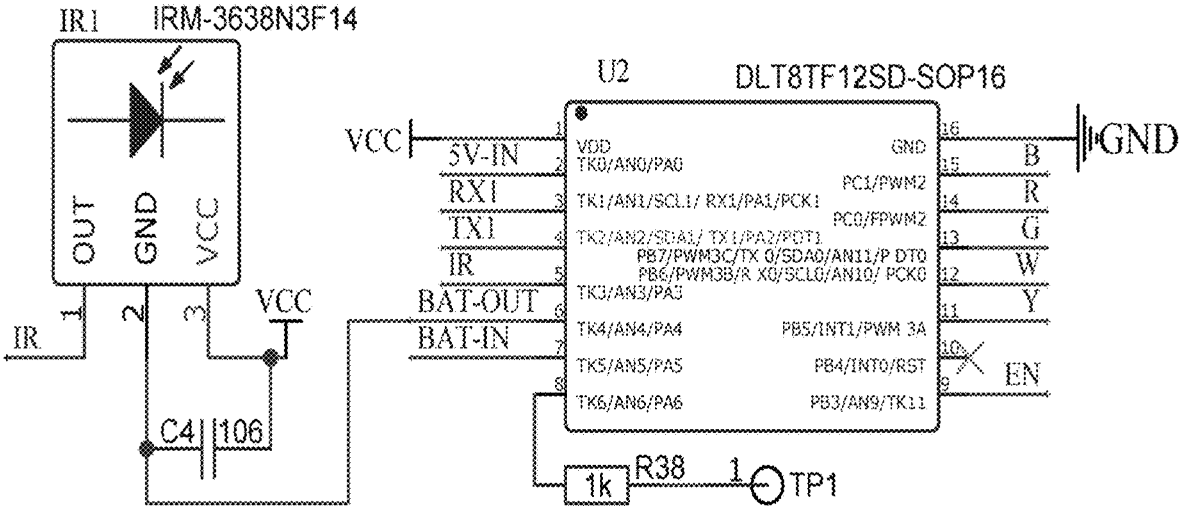
FIG. 21 is a circuit diagram of a controller provided in the present disclosure.
Figure 22:
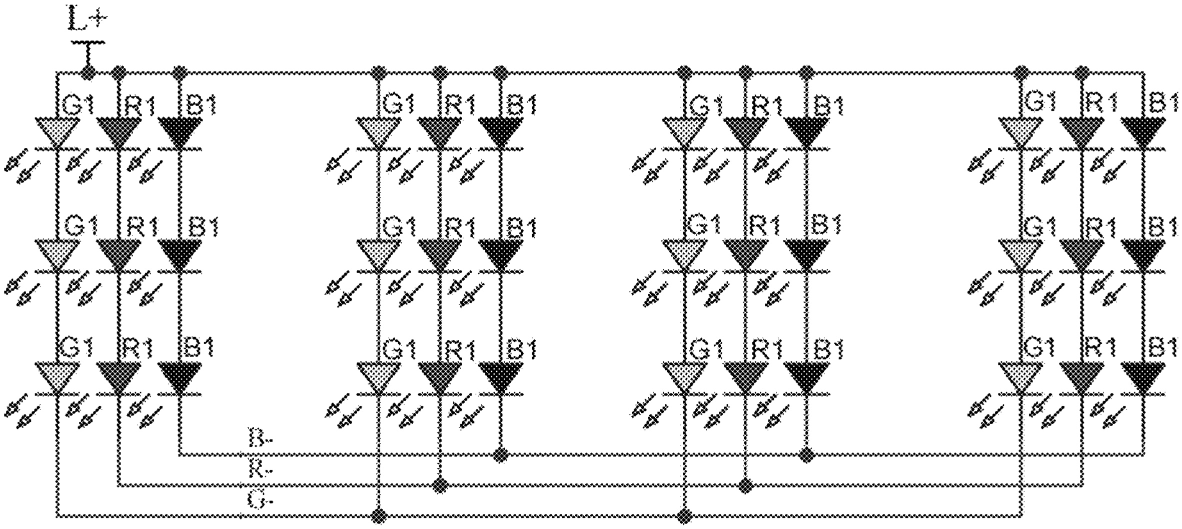
FIG. 22 is a circuit diagram of a first LED red light lamp R1, a first LED green light lamp G1, and a first LED blue light lamp B1 provided in the present disclosure.
Figure 23:
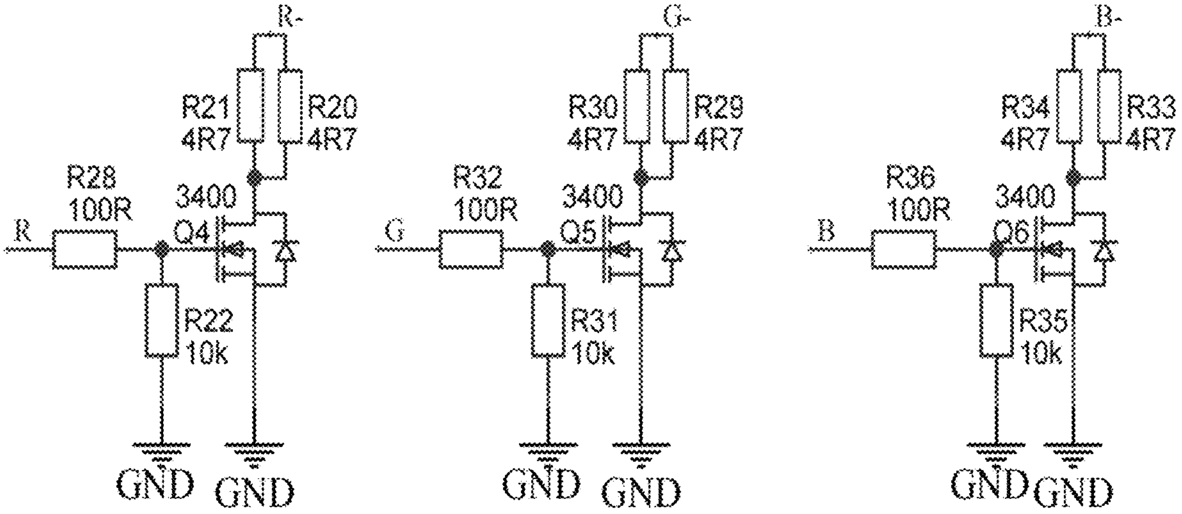
FIG. 23 is a circuit diagram of a red light driving circuit, a green light driving circuit, and a blue light driving circuit provided in the present disclosure.
Figure 24:
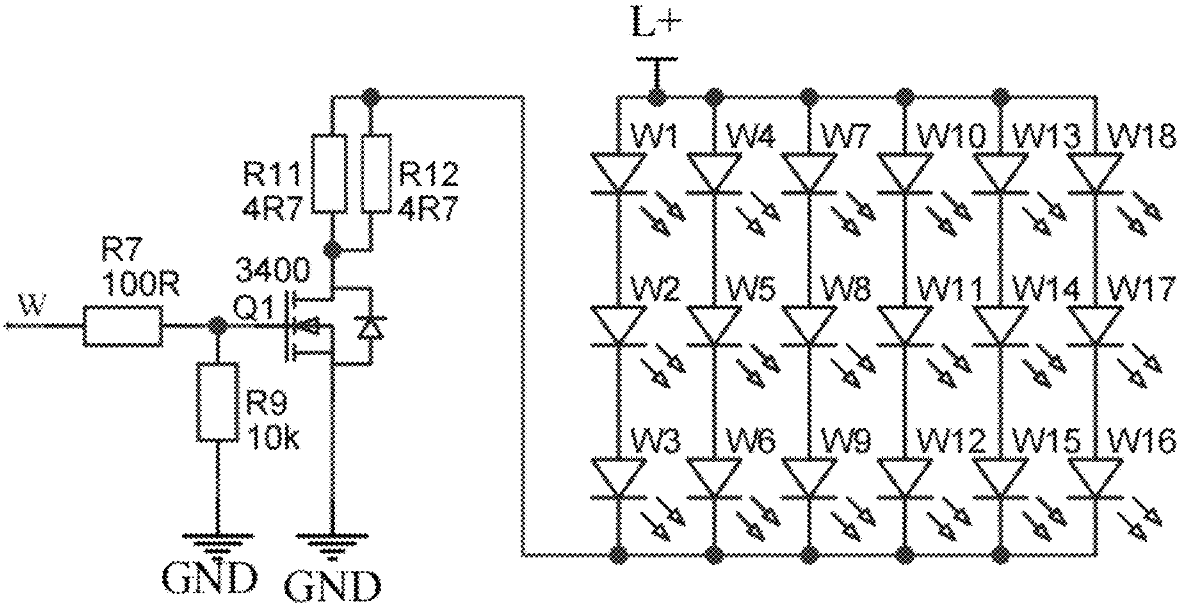
FIG. 24 is a circuit diagram of a white light driving circuit and white light LED provided in the present disclosure.
Figure 25:
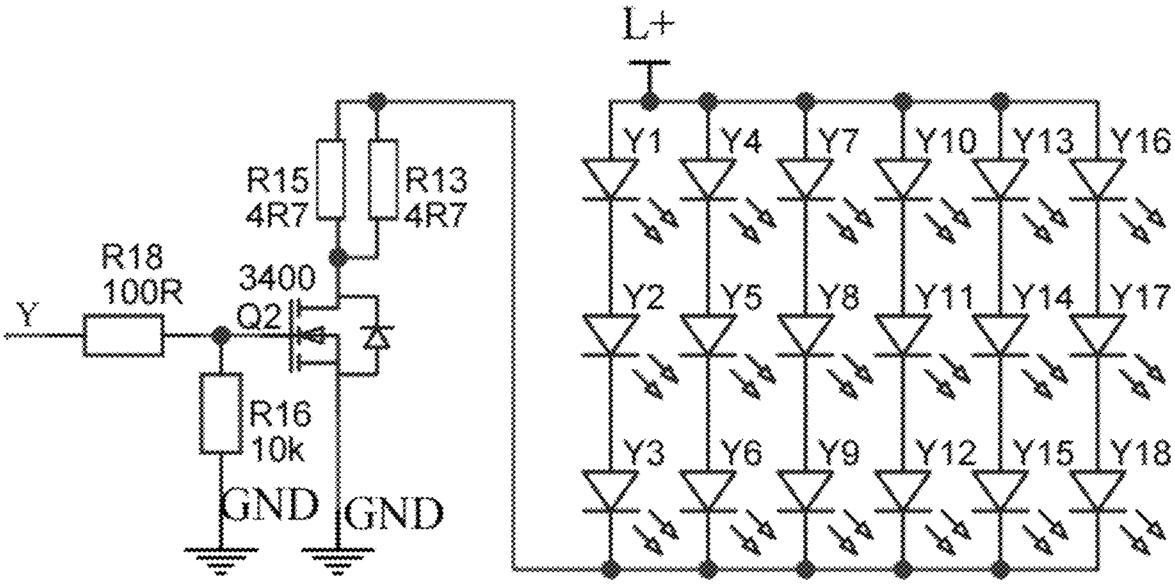
FIG. 25 is a circuit diagram of a warm light driving circuit and white LED provided in the present disclosure.

As shown in FIG. 21, the controller includes a second chip U2, a thirty-eighth resistor R38, a first infrared receiver IR1, and a fourth capacitor C4. An eighth pin of the second chip U2 is connected to a first touch button TP1 through the thirty-eighth resistor R38, a sixth pin of the second chip U2 is connected to a second pin of the first infrared receiver IR1 and one end of the fourth capacitor C4; the other end of the fourth capacitor C4 and a third pin of the first infrared receiver IR1 are connected to a working voltage VCC, and a fr IR1 is connected to a fifth pin of the second chip U2.

Where, as shown in FIGS. 22-25, the lighting component of the present disclosure includes a plurality of LED red lights R1, a plurality of LED green lights G1, a plurality of LED blue lights B1, and a plurality of LED lights W1~W18, and a plurality of warm LED lights Y1~Y18. The light driving circuit includes a red light driving circuit, a green light driving circuit, a blue light driving circuit, a white light driving circuit, and a warm light driving circuit. The red light driving circuit includes a twentieth resistor R20, a twenty-first resistor R21, a twenty-second resistor R22, a twenty-eighth resistor R28, and a fourth MOS transistor Q4; the green light driving circuit includes a twenty-ninth resistor R29, a thirtieth resistor R30, a thirty-first resistor R31, a thirty-second resistor R32, and a fifth MOS transistor Q5; the blue light driving circuit includes a thirty-third resistor R33, a thirty-fourth resistor R34, a thirty-fifth resistor R35, a thirty-sixth resistor R36, and a sixth MOS transistor Q6; the white light driving circuit includes a seventh resistor R7, a ninth resistor R9, an eleventh resistor R11, a twelfth resistor R12, and a first MOS transistor Q1; the warm light driving circuit includes a thirteenth resistor R13, a fifteenth R15, a sixteenth resistor R16, an eighteenth resistor R18, and a second MOS transistor Q2. Specific connection relationships of the components in each driving circuit can be found in FIGS. 22-25. For the sake of simplicity, they will not be elaborated here.

Where, positive electrodes of a first LED red light R1, a first LED green light G1, a first LED blue light B1, LED lights W1~W18, and warm LED lights Y1~Y18 are connected to the driving voltage L+, and negative electrodes thereof are connected to the corresponding driving circuits. The red light driving circuit is connected to a fourteenth pin of the second chip U2 through the twenty-eighth resistor R28, the green light driving circuit is connected to a thirteenth pin of the second chip U2 through a thirty-second resistor R32, the blue light driving circuit is connected to a fifteenth pin of the second chip U2 through a thirty-sixth resistor R36, the white light driving circuit is connected to a twelfth pin of the second chip U2 through the seventh resistor R7, and the warm light driving circuit is connected to an eleventh pin of the second chip U2 through the eighteenth resistor R18. The second chip U2 outputs a driving signal to each driving circuit to drive the corresponding color of the lamp to emit light.

Where, the second chip U2 receives a touch command from a touch button through an eighth pin and controls the corresponding color lights to emit light according to the touch command. Besides that, the second chip U2 can also receive infrared remote-control commands through the first infrared receiver IR1, and control the corresponding color lights to emit light according to the infrared remote control commands.

Figure 26:
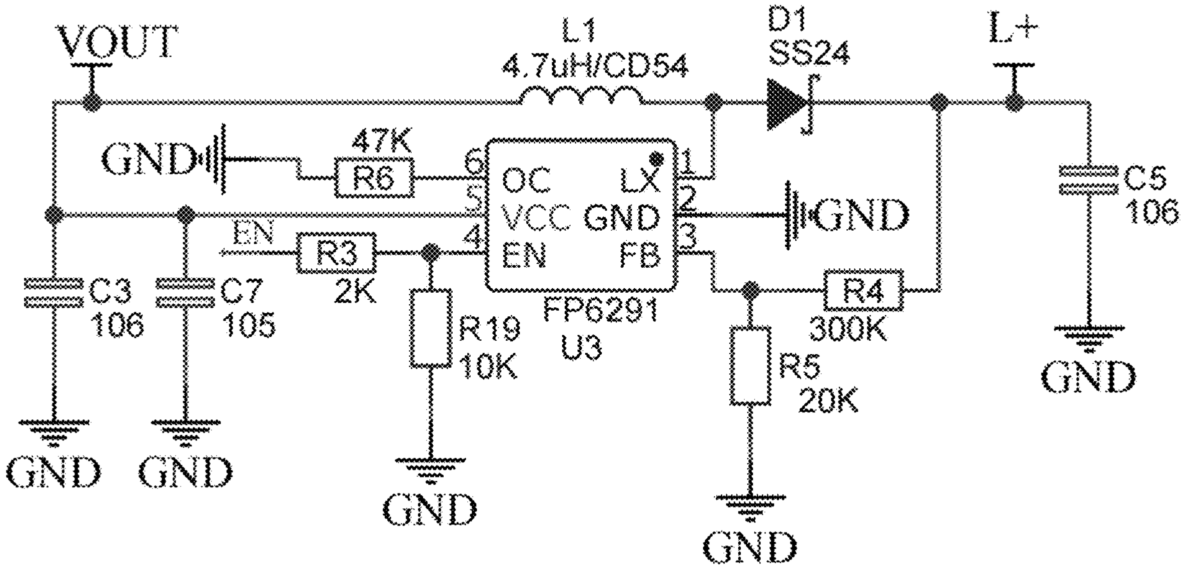
FIG. 26 is a circuit diagram of a first voltage conversion circuit provided in the present disclosure.

As shown in FIG. 26, the first voltage conversion circuit includes a third chip U3, a third capacitor C3, a fifth capacitor C5, a seventh capacitor C7, a third resistor R3, a fourth resistor R4, a fifth resistor R5, a sixth resistor R6, a nineteenth resistor R19, a first inductor L1, and a first voltage regulator diode D1. A connection relationship of each component is shown in FIG. 26. A fourth pin of the third chip U3 is connected to a ninth pin of the second chip U2 through the third resistor R3. The first voltage conversion circuit is configured to convert the power supply voltage VOUT output by the power supply switching circuit into the driving voltage L+, which is configured to drive the various LED lights of the lighting component to emit light.

Figure 27:
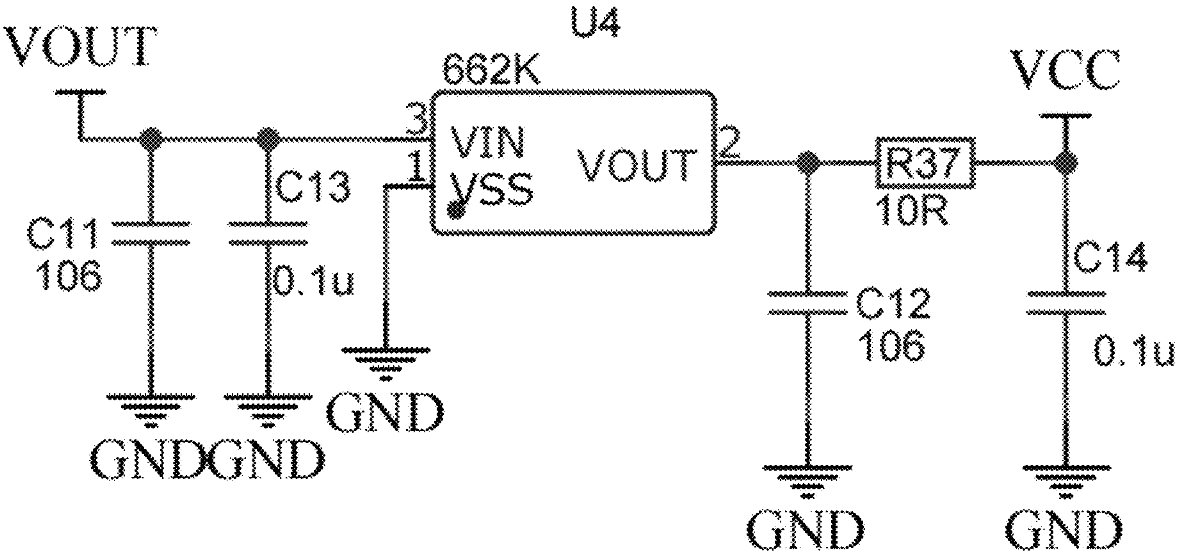
FIG. 27 is a circuit diagram of a second voltage conversion circuit provided in the present disclosure.

As shown in FIG. 27, the second voltage conversion circuit includes a fourth chip U4, a thirty-seventh resistor R37, an eleventh capacitor C11, a twelfth capacitor C12, a thirteenth capacitor C13, and a fourteenth capacitor C14. A connection relationship of each component is shown in FIG. 27. The second voltage conversion circuit is configured to convert the supply voltage VOUT into the working voltage VCC, thereby providing the necessary voltage for the controller to operate.

In summary, the present disclosure provides a lighting device, through a design of the lighting component 11 and the lamp holder component 12, flexible and versatile assembly of the lighting device are achieved, and the use range is increased.

The above are only embodiments of the present disclosure and do not limit the scope of the present disclosure. Any equivalent structure or equivalent process transformation made using the content of this specification and drawings, or directly or indirectly applied in other related technical fields, are also included in the protection scope of the present disclosure.

What is claimed is:

1. A lighting device, comprising a lighting component and a lamp holder component;

wherein the lighting component is connected to the lamp holder component;

the lighting component comprises a translucent body, a lighting base, a first electrical connector, a battery, a light-emitting component, and a first magnetic attraction member;

the transparent body is connected to the lighting base, the first electrical connector is detachably connected to the lighting base;

the battery, the light-emitting component, and first magnetic attraction member are located in the lighting base;

the first electrical connector is provided with a screw mouth configured for transmitting power;

wherein the lamp holder component is provided with a lamp holder body, a protruding part, and a second electrical connector;

the lamp holder body is connected to the protruding part, the second electrical connector is located in the protruding part, and the second electrical connector is connected to an external power source.

2. The lighting device according to claim 1, wherein the first electrical connector is extended into the protruding part, and the screw mouth contacts the second electrical connector.

3. The lighting device according to claim 1, wherein the lamp holder component is provided with a lamp holder body and a second magnetic attraction member.

4. The lighting device according to claim 3, wherein the lamp holder component is further provided with a magnetic suction bracket;

the lamp holder body is connected to the magnetic suction bracket, and the magnetic suction bracket is connected to the second magnetic attraction member.

5. The lighting device according to claim 1, wherein the lamp holder component comprises a lamp holder body and a lamp holder connector;

the lamp holder body is connected to the lamp holder connector.

6. The lighting device according to claim 5, wherein the lamp holder connector is provided with an assembly hole, a threaded interface, a first retaining ring, a second retaining ring, and a fitting groove.

7. The lighting device according to claim 1, further comprising a first support rod, a support seat, a lampshade, and a lampshade connector.

8. The lighting device according to claim 7, wherein the lighting device further comprises a second support rod and a hinge.

9. The lighting device according to claim 1, further comprising a control circuit board, and the control circuit board has a control circuit;

wherein the control circuit comprises a charging interface, a charging circuit, a power supply switching circuit, a controller, a light driving circuit, a first voltage conversion circuit, and a second voltage conversion circuit;

the charging interface is respectively connected to the charging circuit and the power supply switching circuit;

the charging circuit is connected to the battery;

the first voltage conversion circuit is respectively connected to the power supply switching circuit and the light driving circuit;

the second voltage conversion circuit is respectively connected to the power supply switching circuit and the controller, and the controller is connected to the light driving circuit.

* * * * *